(12) United States Patent  
Hollenbeck et al.

(10) Patent No.: US 9,479,104 B1  
(45) Date of Patent: Oct. 25, 2016

(54) SYSTEM AND METHOD FOR TIMED INSERTION OF A PHASE SHIFT CAPACITOR UPON POWERING A SPLIT CAPACITOR ELECTRICAL MOTOR

(71) Applicant: Nidec Motor Corporation, St. Louis, MO (US)

(72) Inventors: Robert K. Hollenbeck, Fort Wayne, IN (US); Bruce C. Ley, Ossian, IN (US); Mark M. Lulling, Fort Wayne, IN (US)

(73) Assignee: Nidec Motor Corporation, St. Louis, MO (US)

( * ) Notice: Subject to any disclaimer, the term of this patent is extended or adjusted under 35 U.S.C. 154(b) by 0 days.

(21) Appl. No.: 14/686,045

(22) Filed: Apr. 14, 2015

(51) Int. Cl.
| | |
|---|---|
| *H02P 1/42* | (2006.01) |
| *H02P 1/44* | (2006.01) |
| *H02P 23/00* | (2016.01) |
| *H02P 25/00* | (2006.01) |
| *H02P 25/04* | (2006.01) |

(52) U.S. Cl.
CPC ..................... *H02P 25/04* (2013.01)

(58) Field of Classification Search
CPC ........................................ H02P 25/04
USPC ........................................... 318/786
See application file for complete search history.

(56) References Cited

U.S. PATENT DOCUMENTS

| | | | | |
|---|---|---|---|---|
| 4,307,327 A | * | 12/1981 | Streater | ........... H02P 1/42 318/786 |
| 5,252,904 A | * | 10/1993 | Nanos | ........... H02P 23/24 318/484 |
| 6,051,952 A | * | 4/2000 | Moreira | ........... H02P 25/04 318/738 |
| 6,982,539 B1 | * | 1/2006 | Ward | ........... H02P 1/445 318/778 |
| 7,630,180 B2 | | 12/2009 | Schmidt et al. | |
| 7,777,438 B2 | | 8/2010 | Schmidt et al. | |
| 8,179,083 B2 | | 5/2012 | Cecconi | |
| 9,003,826 B2 | | 4/2015 | Hatipoglu et al. | |

* cited by examiner

*Primary Examiner* — Erick Glass  
(74) *Attorney, Agent, or Firm* — Maginot Moore & Beck LLP

(57) ABSTRACT

A power circuit is configured with mostly passive electrical components to connect a phase shift capacitor to a phase shift winding of a PSC motor selectively. The power circuit includes a timing circuit, a switching circuit, and a triac having a first anode connected to the second capacitor and a second anode connected to electrical ground. The timing circuit has a plurality of passive electrical components and a single active comparator configured to generate a signal indicative of an expiration of a predetermined time period after application of a line voltage to the motor. The switching circuit has a plurality of passive electrical components and a single active switch, which generates a signal to operate the triac to electrically connect the second capacitor to the second winding during the predetermined time period and to disconnect electrically the second capacitor from the second winding in response to a signal generated by the timing circuit indicating the predetermined time period has expired.

20 Claims, 3 Drawing Sheets

SYSTEM AND METHOD FOR TIMED INSERTION OF A PHASE SHIFT CAPACITOR UPON POWERING A SPLIT CAPACITOR ELECTRICAL MOTOR

TECHNICAL FIELD

This application relates generally to permanent split capacitor (PSC) electrical motors, and, in particular, to circuits for inserting a start capacitor into the power circuit for such motors at the initial powering of the motor.

BACKGROUND

Single-phase permanent split capacitor (PSC) motors are typically used in domestic appliances and air conditioner compressors. These motors have two windings usually denoted as a phase shift winding and a run winding. The phase shift winding has two capacitors, which are arranged in parallel so their capacitances add together, connected to it. One of these capacitors remains connected to the phase shift winding throughout operation of the motor, while the other capacitor is removed from the circuit once the motor reaches its operational speed. These capacitors are known as run and phase shift capacitors, respectively. The phase shift capacitor adds phase shift of the current through the run winding at low speed to increase the starting torque of the rotating field produced by the run winding to enable the rotor to commence rotation. The increased capacitance that helps generate the starting torque, however, does not optimize the performance of the motor once operational speed is reached. Therefore, the phase shift capacitor is removed from the circuit when the operational speed of the motor is reached.

The selective coupling of the phase shift capacitor into and out of the circuit supplying power to the motor windings is performed with different types of components. In some PSC motors, a mechanical switch is mounted to the output shaft of the motor with springs that bias the switch to a closed position, which couples the phase shift capacitor to the power circuit for the motor. As the output shaft approaches the operational speed of the motor, centripetal force acting on the springs stretches the springs and opens the switch, which decouples the phase shift capacitor from the circuit. As long as the output shaft rotates at a speed near the operational speed, the switch remains open and the capacitor remains out of the power circuit for the motor. Other PSC motors use relays to couple the phase shift capacitor selectively to the power circuit and still other PSC motors use sophisticated controllers that monitor the power circuit and remove the phase shift capacitor in response to predetermined conditions being detected in the circuit.

All of the previously known circuits for selectively decoupling a phase shift capacitor from the power circuit are relatively expensive. The mechanical switch is an additional component mounted to the output shaft, which not only is expensive to produce, but it also contributes to motor failure as the springs and the switch age and deteriorate. The relays are also costly items as are the microprocessors and other solid state control devices used to control the coupling and decoupling of the phase shift capacitor to the motor circuit. Retail prices for domestic appliances and compressors are closely related to the production costs for these devices. Reducing production costs in the motors used to run these devices would be beneficial.

SUMMARY

A method of coupling and decoupling a phase shift capacitor into the power circuit for a PSC motor predominantly uses passive components for that purpose. The method includes connecting a line voltage of a single phase power supply across a first winding of the PSC motor and to a second winding of the PSC motor, providing a first capacitor and a second capacitor in parallel to one another at a common node electrically connected to the second winding of the PSC motor and also electrically connecting the first capacitor to a neutral line of the single phase power supply, providing a triac with a first anode connected to the second capacitor and a second anode connected to electrical ground, generating a signal indicative of an expiration of a predetermined time period commencing at the connection of the line voltage with a timing circuit having a plurality of passive electrical components and a single active comparator, the timing circuit having an input electrically connected to the line voltage, and operating the triac with a switching circuit to electrically connect the second capacitor to the second winding during the predetermined time period and to disconnect electrically the second capacitor from the second winding in response to the signal generated by the timing circuit, the switching circuit having a plurality of passive electrical components and a single active switch, an input of the switching circuit being electrically connected to an output of the timing circuit and an output of the switching circuit being electrically connected to a gate of the triac.

A PSC motor couples and decouples a phase shift capacitor into the power circuit with a circuit primarily made with passive components. The PSC motor includes a connector configured to couple electrical a line voltage of a single phase power supply across a first winding of the PSC motor and to a second winding of the PSC motor, a first capacitor and a second capacitor connected to one another in parallel and at a common node to the second winding of the PSC motor, the first capacitor also being electrically connected to a neutral line of the single phase power supply, a triac having a first anode connected to the second capacitor and a second anode connected to electrical ground, a timing circuit having a plurality of passive electrical components and a single active comparator, the timing circuit having an input electrically connected to the line voltage and the timing circuit being configured to generate a signal indicative of an expiration of a predetermined time period from application of the line voltage to the connector, and a switching circuit having a plurality of passive electrical components and a single active switch, an input of the switching circuit being electrically connected to an output of the timing circuit and an output of the switching circuit being electrically connected to a gate of the triac, a signal on the output of the switching circuit operating the triac to electrically connect the second capacitor to the second winding during the predetermined time period and to disconnect electrically the second capacitor from the second winding in response to the signal generated by the timing circuit.

BRIEF DESCRIPTION OF THE FIGURES

The foregoing aspects and other features of a PSC motor that is configured to control the coupling and decoupling of a phase shift capacitor into a power circuit for the motor are described in connection with the accompanying drawings.

DETAILED DESCRIPTION

Figure 1:
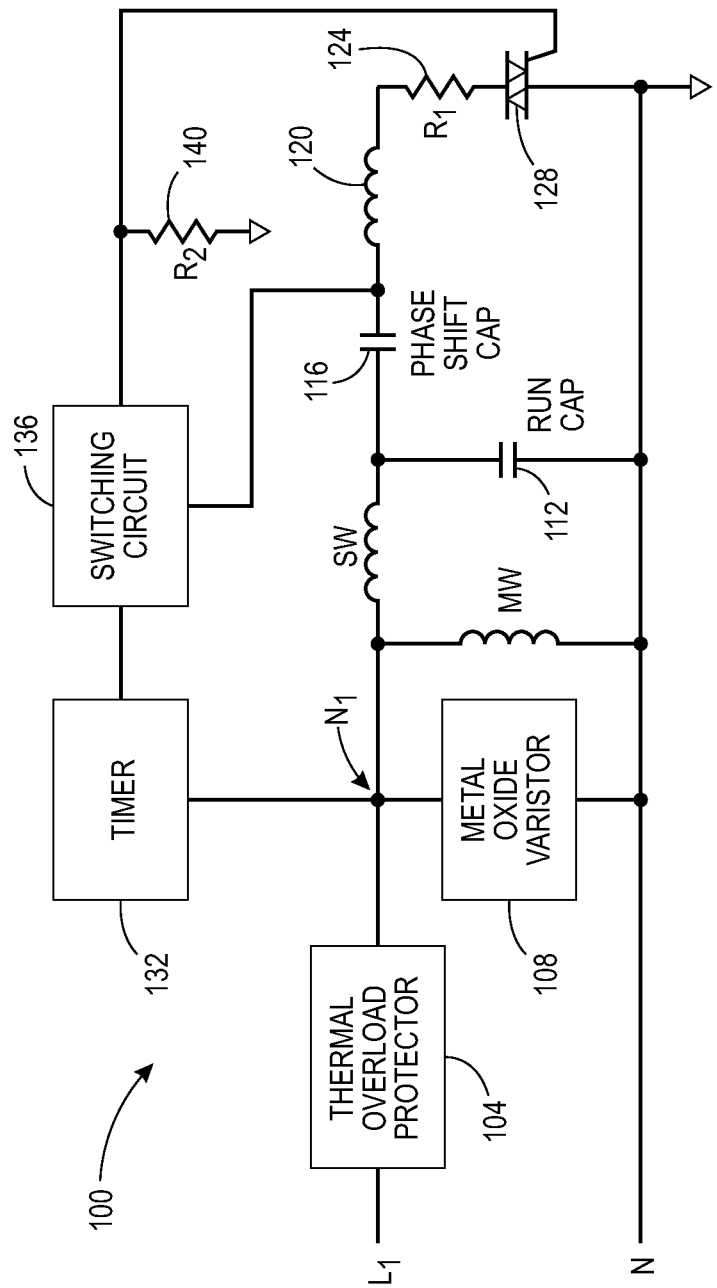
FIG. 1 is a block diagram of a circuit for selectively coupling a phase shift capacitor to a phase shift winding in a PSC motor.

For a general understanding of the environment for the system and method disclosed herein as well as the details for the system and method, reference is made to the drawings. In the drawings, like reference numerals have been used throughout to designate like elements.

FIG. 1 is a block diagram of an electrical circuit that electrically connects a capacitor to the phase shift winding of a PSC motor for a predetermined period of time to increase the starting torque and then electrically disconnects the capacitor until the line voltage to the motor is removed. The circuit 100 is connected by a switch (not shown) to a single phase power supply, such as a 120V, 60 Hz source (not shown), although other power sources can be used. In the figure, $L_1$ represents the line voltage and N represents the neutral line, although the motor operates in the same manner as described below if these lines are reversed. A thermal overload protector 104 and a metal oxide varistor 108 are provided as shown to protect the motor in the event that the motor heats to a temperature that could possibly damage components and to remove transients on the line voltage that could damage the electronic components of the circuit, respectively.

The remainder of the circuit of FIG. 1 includes a main motor winding MW, a phase shift motor winding SW, a run capacitor 112, a start capacitor 116, an inductor 120, a resistor $R_1$ 124, a triac 128, a timer 132, a switching circuit 136, and a resistor $R_2$ 140. The thermal load protector 104, metal oxide varistor 108, timer 132, and the motor windings MW and SW are electrically connected at node $N_1$. Run capacitor 112 is serially connected to one end of the phase shift winding SW and to the neutral N. Start capacitor 116 is electrically connected in parallel to the run capacitor 112 so their capacitances add when the start capacitor 116 is electrically connected to electrical ground through inductor 120, resistor 124, and triac 128, when the triac 128 is in its "on" state. The operation of triac 128 is controlled by timer 132 and switching circuit 136. In brief, timer 132 detects electrical power being applied to the motor at node $N_1$ at start-up and enables the switching circuit 136 to generate a signal on the gate of triac 128 that electrically connects start capacitor 136 to electrical ground. This operation enables the capacitance of the start capacitor 116 to be added to the capacitance of the run capacitor 112 to add phase shift to the current in the windings and increase the starting torque. The inductor 120 and the resistor 124 limit the maximum current through the triac 128. When the predetermined time period expires, the timer 132 changes the state of the signal to the switching circuit 136 and the signal to the gate of the triac 128 no longer enables the electrical connection of the start capacitor 116 to electrical ground. The connection from one end of the start capacitor 116 to the switching circuit keeps the voltage on the start capacitor 116 from retriggering the triac 128 once the start capacitor has been removed from the circuit. The resistor $R_2$ 140 provides a path to ground for electrical noise and helps immunize the triac from being triggered by such noise.

Figure 2:
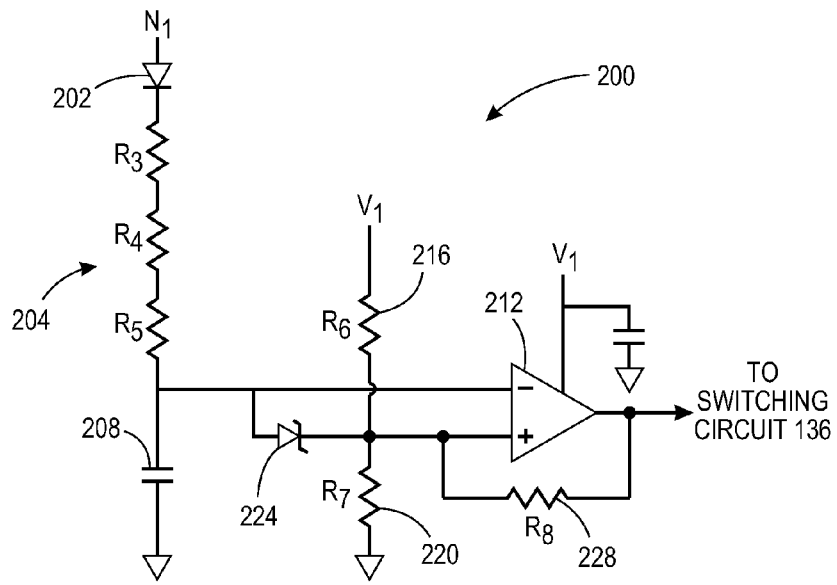
FIG. 2 is an electrical schematic diagram of a circuit that implements the timer of FIG. 1.

FIG. 2 is an electrical diagram of a circuit 200 that can be used to implement the timer 132. Diode 202 and resistor 204 electrically connect capacitor 208 to the line voltage at node $N_1$ to rectify the voltage and charge the capacitor. The resistor 204 is depicted as a series connection of three resistors, although other configurations of resistors can be used. These resistors are arranged as shown in FIG. 2 to prevent the voltage limits for the individual resistors from being exceeded. The voltage on the capacitor is provided to the inverting input of the operational amplifier 212. A voltage $V_1$ is derived from the line voltage by rectifying the voltage and reducing it to an appropriate level for operating the operational amplifier 212 and the transistors of the switching circuit 136 shown in FIG. 3. In one embodiment, this voltage $V_1$ is 4.7V, although other voltages can be used depending upon the components to be operated by the voltage. The voltage $V_1$ is dropped across the voltage divider formed by resistors $R_6$ 216 and $R_7$ 220 to provide a reference signal for the non-inverting input of the operational amplifier 212. The anode of schottky diode 224 is electrically connected to the voltage on capacitor 208 and the cathode of schottky diode 224 is electrically connected to the node of the resistor divider formed by resistor 216 and resistor 220. This schottky diode operates to keep the voltage on the inverting input of the amplifier 212 from exceeding the voltage limit for the input and to allow capacitor 208 to discharge when electrical power is removed from circuit 100 so the capacitor 208 is reset to a voltage close to zero volts. When the voltage on the capacitor 208 builds to a level at a time corresponding to the time constant of resistor 204 and capacitor 208 that exceeds the reference signal on the non-inverting input of operational amplifier 212, the output of the operational amplifier 212 goes from a logical "1" to a logical "0." The resistor $R_8$ 228 adds hysteresis to keep the output of the operational amplifier, which is operating as a comparator, to the logical zero state. The change in the output of the amplifier 212 to a zero state causes the switching circuit 136 to disconnect the start capacitor from the electrical circuit of FIG. 1 as explained below. As used in this document, the term "active comparator" refers to an operational amplifier or other active electrical component that is configured to compare a signal at one input of the active electrical component to a reference signal and to generate a signal indicative of whether the signal at the one input is equal to or greater than the reference signal.

Figure 3:
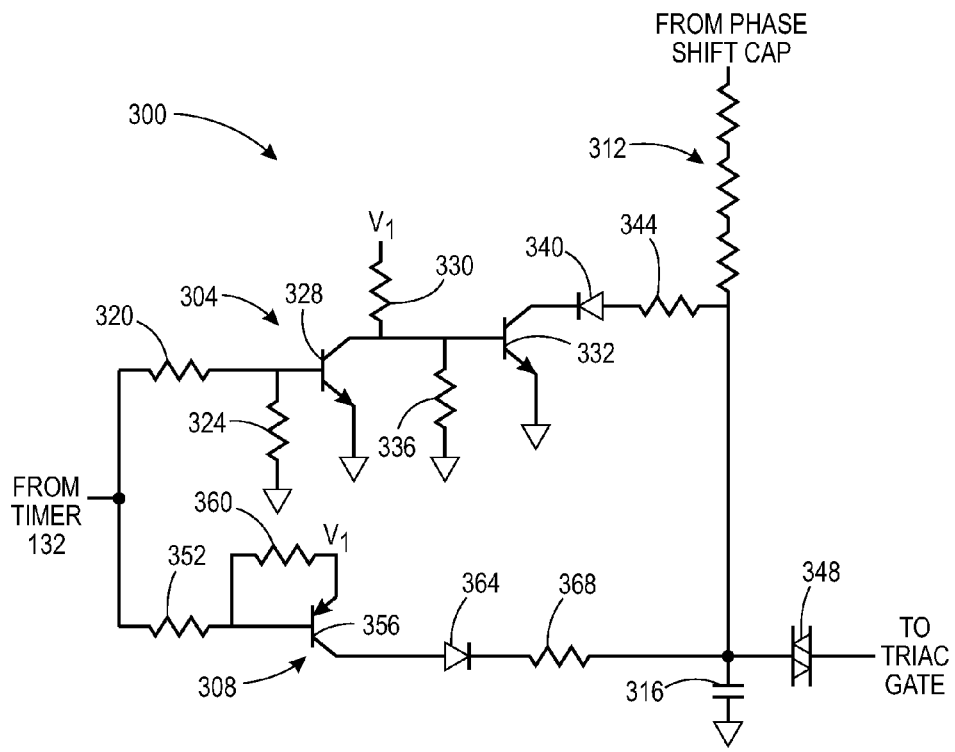
FIG. 3 is an electrical schematic diagram of a circuit that implements the switching circuit of FIG. 1.

FIG. 3 is an electrical diagram of a circuit 300 that can be used to implement the switching circuit 136. The output of the operational amplifier 212 from the timer 132 is provided to a first circuit 304 having an output electrically connected to the node between a resistor 312 and a capacitor 316 electrically connected to one end of the start capacitor 116 and a second circuit 308 having an output electrically connected to the node between the resistor 312 and the capacitor 316. Again, the resistor 312 is shown as a series of resistors for reasons similar to those stated above with regard to resistor 204. When the operational amplifier 212 is a logical zero, the first circuit 304 is configured to shunt charge on the capacitor 316 to electrical ground during a negative half cycle of the voltage at the junction of the phase shift capacitor 116 and inductor 120, and the second circuit 308 is configured to shunt charge on the capacitor 316 to electrical ground during a positive half cycle of the voltage at the junction of the capacitor 116 and the inductor 120. Capacitor 316 is kept below the trigger voltage for the diac 348 so the diac 348 does not activate the triac 128.

In more detail, the output of the amplifier 212 is electrically connected by the voltage divider formed by resistor 320 and resistor 324 to the base of NPN transistor 328. The collector of transistor 328 is electrically connected to voltage $V_1$ through resistor 330 and the emitter is electrically connected to electrical ground. The voltage $V_1$ through resistor 330 and the collector of transistor 328 are electrically connected to the base of NPN transistor 332 and a resistor 336 is electrically connected between the base of the transistor 332 and electrical ground. The emitter of transistor 332 is connected to electrical ground and the collector of transistor 332 is electrically connected to the cathode of diode 340. The anode of diode 340 is electrically connected to resistor 312 through resistor 344. This configuration enables the logical one output of the timer 132 while the start capacitor 116 is electrically connected to the circuit 100 to activate transistor 328 and pull the $V_1$ voltage to electrical ground through the transistor 328. This operation disables transistor 332 so the positive cycle of the voltage from capacitor 116 enables the voltage across capacitor 316 to trigger diac 348 to the gate of triac 128 and connect capacitor 116 to node N through inductor 120, resistor 121, and triac 128. When the output of the timer 132 goes to a logic low, the transistor 328 is turned off and the voltage $V_1$ through resistor 330 forward biases the base-emitter leg of transistor 332 so transistor 332 conducts the positive cycle of voltage from the capacitor 116 through resistor 344 and diode 340 to electrical ground so capacitor 316 does not charge to a voltage that exceeds the trigger voltage for the diac 348. This operation prevents the voltage on capacitor 316 from activating the diac 348 and the gate of the triac 128.

With regard to circuit 308 in FIG. 3, the output of the amplifier 212 is electrically connected through resistor 352 to the base of PNP transistor 356. The emitter of transistor 356 is electrically connected to voltage $V_1$ and to the base of transistor 356 through resistor 360. The collector of transistor 356 is electrically connected to the anode of diode 364 and the cathode of diode 364 is electrically connected to the node between the resistor 312 and the capacitor 316 through resistor 368. This configuration enables the logical one output of the timer 132 to disable transistor 356 so the negative cycle of the voltage from capacitor 116 enables the voltage across capacitor 316 to decrease to the negative trigger voltage for the diac 348 so the diac 348 turns on the gate of triac 128 and connects capacitor 116 to node N through inductor 120, resistor 121, and triac 128. When the output of the timer 132 goes to a logic low, the voltage at the base of the transistor 356 forward biases the emitter-base leg of the transistor 356 and the voltage $V_1$ passes through the collector of the transistor 356, diode 364, and resistor 368 so the transistor 356 conducts during the negative half cycle of the voltage at capacitor 316. Thus, the capacitor 316 is electrically connected to the voltage V1 while the transistor 356 conducts so capacitor 316 does not charge to a negative voltage that exceeds the negative trigger voltage for the diac 348. Thus, the negative cycle of the line voltage does not result in the activation of the triac 128.

Figure 4:
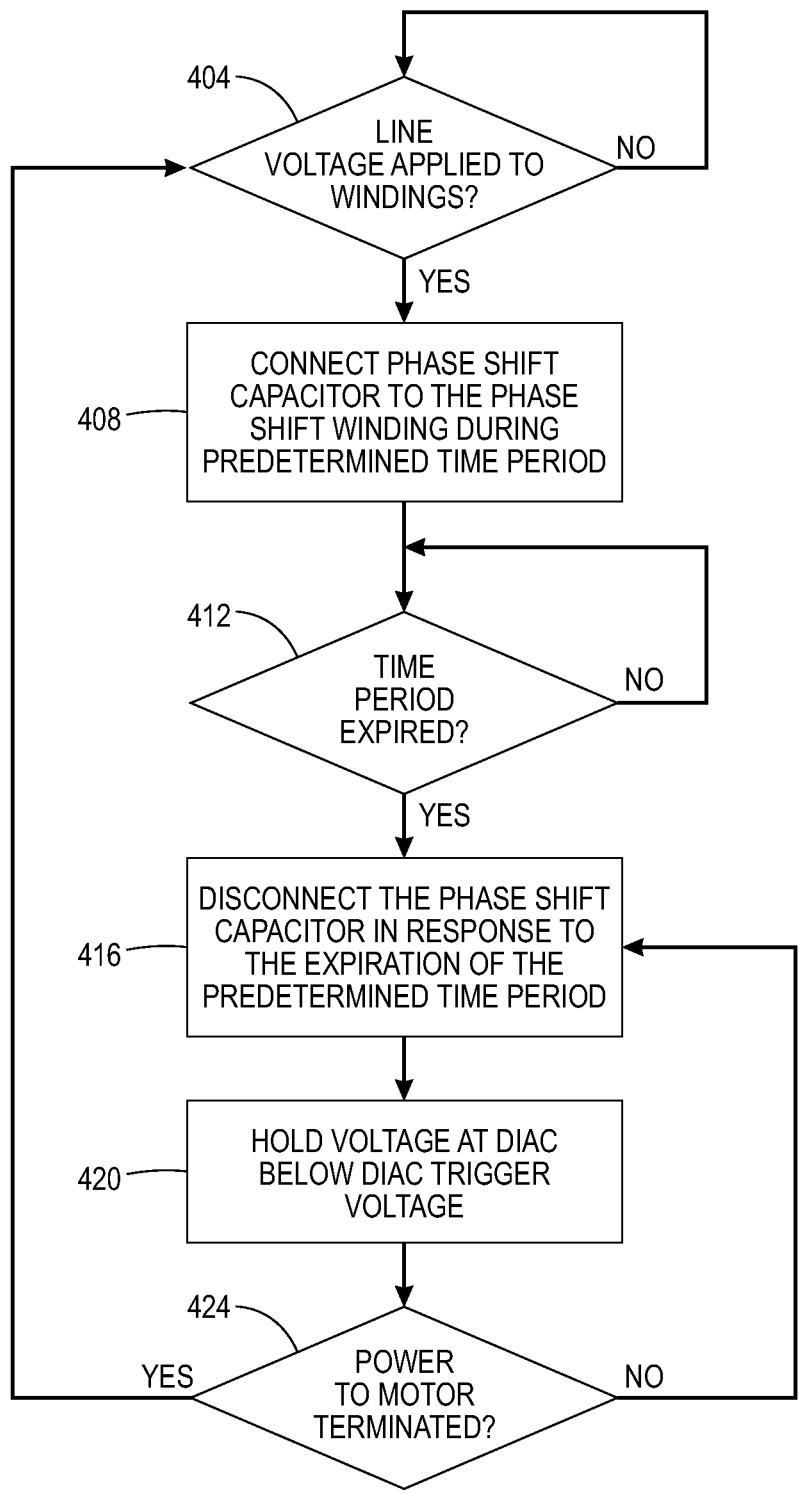
FIG. 4 is a flow diagram of a process for selectively coupling a phase shift capacitor to a phase shift winding in a PSC motor.

FIG. 4 depicts a process 400 for selectively coupling a phase shift capacitor to a phase shift winding in a PSC motor. For purposes of illustration, process 400 is described in conjunction with the embodiment of the PSC motor circuit 100, but alternative embodiments are also suitable for use with process 400. In the process, the application of a line voltage of a single phase power supply to the main winding and the phase shift winding of the PSC motor is detected (block 404). One end of the start capacitor serially connected to one end of the phase shift winding is electrically connected to electrical ground because the output of timer circuit 132 remains a logical low during a predetermined time period, which commences at the application of electrical power. During this predetermined time period, the switching circuit 136 enables capacitor 316 to charge to a voltage that triggers diac 348 and turns on triac 128 to electrically connect the phase shift capacitor to the phase shift winding (block 408). The predetermined time period corresponds to the time constant of the resistor 204 and the capacitor 208. When the voltage on capacitor 208 exceeds the reference voltage on comparator 212, the timer circuit output generates a signal indicative of the time period expiring (block 412) and, upon expiration of the time period, the signal from the timer circuit 132 causes the switching circuit 136 to deactivate the diac and, consequently the triac 128 to disconnect the phase shift capacitor from electrical ground and therefore from the phase shift winding (block 416). Thereafter, the voltage at the anode of the diac 128 connected to the node between the resistor 312 and the capacitor 316 is held at a level that prevents the diac 348 from triggering (block 420). In the circuits described above, this holding of the voltage at the diac 128 is achieved during positive cycles of the voltage at the phase capacitor 116 by shunting the voltage across capacitor 116 to ground through transistor 332 in the switching circuit 136 and, during the negative portions of the voltage cycle, electrically connecting that voltage to the voltage $V_1$ through transistor 356 in the switching circuit 136. This phase shift capacitor 116 remains disconnected from the phase shift winding and the voltage on the diac stays below the trigger voltage (blocks 416, 420) until power to the motor is terminated (block 424) and the process waits for the next powering of the motor (block 404).

Those skilled in the art will recognize that numerous modifications can be made to the specific implementations described above. Therefore, the following claims are not to be limited to the specific embodiments illustrated and described above. The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

What is claimed is:

1. A circuit for powering a permanent split capacitor (PSC) motor comprising:
   a connector configured to couple electrical a line voltage of a single phase power supply across a first winding of the PSC motor and to a second winding of the PSC motor;
   a first capacitor and a second capacitor connected to one another in parallel and at a common node to the second winding of the PSC motor, the first capacitor also being electrically connected to a neutral line of the single phase power supply;
   a triac having a first anode connected to the second capacitor and a second anode connected to electrical ground;
   a timing circuit having a plurality of passive electrical components and a single active comparator, the timing circuit having an input electrically connected to the line voltage and the timing circuit being configured to generate a signal indicative of an expiration of a predetermined time period from application of the line voltage to the connector; and
   a switching circuit having a plurality of passive electrical components and a single active switch, an input of the switching circuit being electrically connected to an output of the timing circuit and an output of the switching circuit being electrically connected to a gate of the triac, a signal on the output of the switching circuit operating the triac to electrically connect the second capacitor to the second winding during the predetermined time period and to disconnect electrically the second capacitor from the second winding in response to the signal generated by the timing circuit.

2. The circuit of claim 1 further comprising:
a resistor electrically connected between the output of the switching circuit and electrical ground to disable the triac from being activated.

3. The circuit of claim 1 wherein the single active comparator of the timing circuit is an operational amplifier having an inverting input electrically connected to a node between a resistor and a capacitor, a non-inverting input electrically connected between a predetermined voltage and a plurality of resistors, and an output that generates the signal indicative of the expiration of the predetermined time period.

4. The circuit of claim 3 wherein the inverting input of the operational amplifier is electrical connected to the line voltage through the resistor and an end of the capacitor not connected to the resistor is electrically connected to electrical ground to enable the capacitor to charge through the resistor at a time constant corresponding to the predetermined time period.

5. The circuit of claim 4 further comprising:
a schottky diode having an anode electrically connected to the node between the resistor and the capacitor and a cathode electrically connected to the non-inverting input of the operational amplifier and the plurality of resistors.

6. The circuit of claim 5 further comprising:
a resistor electrically connected at one end to the output of the operational amplifier and at another end to the cathode of the schottky diode, the non-inverting input of the operational amplifier, and between two resistors in the plurality of resistors.

7. The circuit of claim 1, the single active switch of the switching circuit further comprising:
a diac having one anode electrically connected to a node between a resistor and a third capacitor and another anode electrically connected to the gate of the triac.

8. The circuit of claim 7, the switching circuit further comprising:
a first circuit having an input electrically connected to the input of the switching circuit and an output electrically connected to the node between the resistor and the capacitor; and
a second circuit having an input electrically connected to the input of the switching circuit and an output electrically connected to the node between the resistor and the capacitor, the first circuit and the second circuit being configured to keep a voltage on the anode of the diac below a predetermined voltage that activates the diac in response to the second capacitor being electrically disconnected from the second winding.

9. The circuit of claim 8, the first circuit further comprising:
a transistor configured to shunt the node between the resistor and the third capacitor to electrical ground during positive cycles of the line voltage in response to the expiration of the predetermined time period.

10. The circuit of claim 8, the second circuit further comprising:
a transistor configured to electrically connect the node between the resistor and the third capacitor to the predetermined voltage during negative cycles of the line voltage in response to the expiration of the predetermined time period.

11. A method of providing electrical power to a permanent split capacitor (PSC) motor comprising:
connecting a line voltage of a single phase power supply across a first winding of the PSC motor and to a second winding of the PSC motor;
providing a first capacitor and a second capacitor in parallel to one another at a common node electrically connected to the second winding of the PSC motor and also electrically connecting the first capacitor to a neutral line of the single phase power supply;
providing a triac with a first anode connected to the second capacitor and a second anode connected to electrical ground;
generating a signal indicative of an expiration of a predetermined time period commencing at the connection of the line voltage with a timing circuit having a plurality of passive electrical components and a single active comparator, the timing circuit having an input electrically connected to the line voltage; and
operating the triac with a switching circuit to electrically connect the second capacitor to the second winding during the predetermined time period and to disconnect electrically the second capacitor from the second winding in response to the signal generated by the timing circuit, the switching circuit having a plurality of passive electrical components and a single active switch, an input of the switching circuit being electrically connected to an output of the timing circuit and an output of the switching circuit being electrically connected to a gate of the triac.

12. The method of claim 11 further comprising:
providing a resistor between the output of the switching circuit and electrical ground to disable the triac from being activated.

13. The method of claim 11 further comprising:
providing the single active comparator of the timing circuit with an operational amplifier having an inverting input electrically connected to a node between a resistor and a capacitor, a non-inverting input electrically connected between a predetermined voltage and a plurality of resistors, and an output that generates the signal indicative of the expiration of the predetermined time period.

14. The method of claim 13 further comprising:
electrically connecting the inverting input of the operational amplifier to the line voltage through the resistor; and
electrically connecting an end of the capacitor to the resistor to electrical ground to enable the capacitor to charge through the resistor at a time constant corresponding to the predetermined time period.

15. The method of claim 14 further comprising:
electrically connecting an anode of a schottky diode to the node between the resistor and the capacitor; and
electrically connecting a cathode to the non-inverting input of the operational amplifier and the plurality of resistors.

16. The method of claim 15 further comprising:
electrically connecting a resistor at one end to the output of the operational amplifier; and
electrically connecting another end of the resistor to the cathode of the schottky diode, the non-inverting input of the operational amplifier, and between two resistors in the plurality of resistors.

17. The method of claim 11 further comprising:
providing the single active switch of the switching circuit with a diac having one anode electrically connected to a node between a resistor and a third capacitor and another anode electrically connected to the gate of the triac.

18. The method of claim 7, the provision of the switching circuit further comprising:
providing a first circuit having an input electrically connected to the input of the switching circuit and an output electrically connected to the node between the resistor and the third capacitor, the first circuit being configured to shunt charge on the capacitor to electrical ground in response to the second capacitor being electrically disconnected from the second winding; and
providing a second circuit having an input electrically connected to the input of the switching circuit and an output electrically connected to the node between the resistor and the third capacitor, the second circuit being configured to electrically connect the third capacitor to a predetermined voltage that is less than a voltage that activates the diac in response to the second capacitor being electrically disconnected from the second winding.

19. The method of claim 18, the provision of the first circuit further comprising:
configuring a transistor in the first circuit to shunt the node between the resistor and the third capacitor to electrical ground during positive cycles of the line voltage in response to the expiration of the predetermined time period.

20. The method of claim 18, the provision of the second circuit further comprising:
configuring a transistor to electrically connect the node between the resistor and the third capacitor to the predetermined voltage during negative cycles of the line voltage in response to the expiration of the predetermined time period.

* * * * *